US006980770B1

(12) United States Patent
Murphy et al.

(10) Patent No.: US 6,980,770 B1
(45) Date of Patent: Dec. 27, 2005

(54) MOBILE MARINE COMMUNICATIONS APPARATUS

(75) Inventors: Karen D. Murphy, Flower Mound, TX (US); Paul Huber, Colleyville, TX (US); Kent David Newman, Hurst, TX (US)

(73) Assignee: Uniden America Corporation, Ft. Worth, TX (US)

( * ) Notice: Subject to any disclaimer, the term of this patent is extended or adjusted under 35 U.S.C. 154(b) by 469 days.

(21) Appl. No.: 10/206,502

(22) Filed: Jul. 26, 2002

(51) Int. Cl.[7] .................................................. H04B 7/15
(52) U.S. Cl. ....................... 455/11.1; 455/69; 340/539; 342/357.09
(58) Field of Search ................................ 455/522, 450, 455/66.1, 69, 517–518, 161, 67.1, 11.1; 340/539, 340/573.6; 342/357.09

(56) References Cited

U.S. PATENT DOCUMENTS

| | | | | |
|---|---|---|---|---|
| 3,939,418 A | | 2/1976 | Morrison et al. | |
| 5,163,158 A | * | 11/1992 | Tendler et al. | 455/11.1 |
| 5,231,699 A | * | 7/1993 | Tendler | 455/66.1 |
| 5,644,620 A | | 7/1997 | Shimura | |
| 5,699,409 A | | 12/1997 | Kojima | |
| 5,809,417 A | | 9/1998 | Nealon et al. | |
| 6,006,102 A | | 12/1999 | Touzeau | |
| 6,023,627 A | | 2/2000 | Fuchisawa | |
| 6,078,822 A | | 6/2000 | Tsujita | |
| 6,222,484 B1 | * | 4/2001 | Seiple et al. | 342/357.09 |
| 6,233,461 B1 | * | 5/2001 | Chinitz et al. | 455/522 |
| 6,285,281 B1 | | 9/2001 | Gatto | |
| 6,373,430 B1 | | 4/2002 | Beason et al. | |
| 6,397,049 B1 | | 5/2002 | Lee et al. | |
| 6,397,075 B1 | | 5/2002 | Sastrodjojo et al. | |
| 2004/0203815 A1 | * | 10/2004 | Shoemake et al. | 455/450 |

OTHER PUBLICATIONS

"Marine Radio Could Be A Lifesaver"; U.S. Coastguard-Office of Boating Safety; 3 pages.

"Equipment Requirements"; U.S. Coastguard- Office of Boating Safety; Oct. 23, 2001; 3 pages.

"Marine VHF Radio Channels"; Federal Communications Commision; Aug. 22, 2001; 2 pages.

"Ship Radio Stations"; Federal Communications Commision; Apr. 24, 2002; 11 pages.

* cited by examiner

*Primary Examiner*—Lester G. Kincaid
*Assistant Examiner*—Phuoc Doan
(74) *Attorney, Agent, or Firm*—Lawrence R. Youst; Danamraj & Youst, P.C.

(57) ABSTRACT

A mobile communications apparatus (84) for wireless communication with a fixed mount marine radio (82) is disclosed. A radio-frequency communicator (120) is selectively operable to transmit wireless communications to the fixed mount marine radio (82) in a sending mode and to receive wireless communications from the fixed mount marine radio (82) in a receiving mode. A speaker (114) and microphone (112) are coupled to the radio-frequency communicator (120) to enable audio communication. An actuator (122) operates the radio-frequency communicator (120) between the sending mode and the receiving mode.

32 Claims, 7 Drawing Sheets

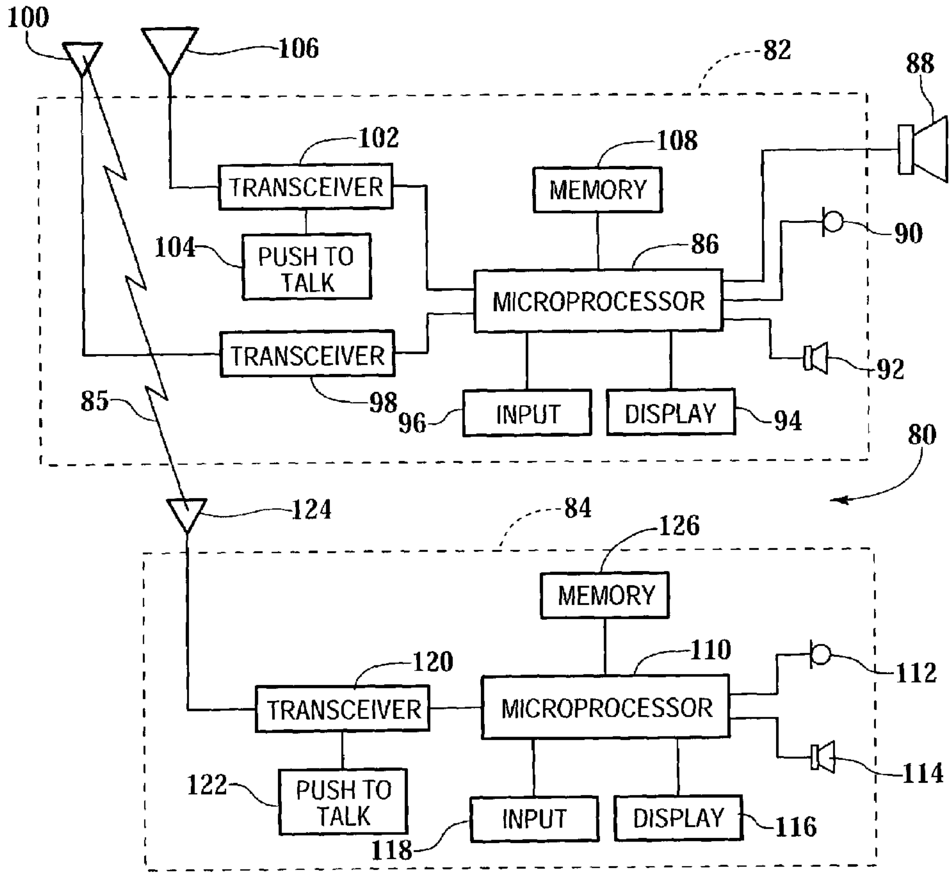
*Fig.3A*
*Fig.4*
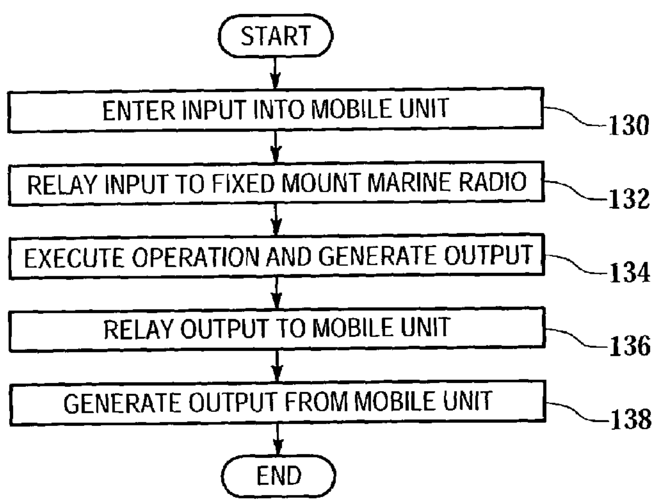

MOBILE MARINE COMMUNICATIONS APPARATUS

TECHNICAL FIELD OF THE INVENTION

This invention relates, in general, to the transmission of communications and, in particular, to a mobile communications apparatus for wireless communication with a fixed mount marine radio and a system and method for marine communications.

BACKGROUND OF THE INVENTION

A shipboard radio station includes all of the transmitting and receiving equipment installed aboard a ship for communications afloat. Depending on the size, purpose or destination of a ship, its radio station must meet certain requirements established by law or treaty. For example, large passenger or cargo ships that travel on the open sea are required by the Communications Act and by international agreements to be equipped with a radio station for long distance radio communications. Passenger ships that travel along the coast must be able to communicate at shorter range with coast stations. These are examples of "compulsory ships" because they are required or compelled by treaty or statute to be equipped with specified communications equipment.

Smaller ships used for recreation, e.g., sailing, diving, fishing or water skiing, are not required to have radio stations installed but they may be so equipped by choice. These ships are known as "voluntary ships" because they are not required by treaty or statute to carry a radio but may voluntarily fit some of the same equipment used by compulsory ships.

A shipboard radio station may communicate with other ship stations or coast stations primarily for safety, and secondarily for navigation and operational efficiency. The FCC regulates marine communications in cooperation with the U.S. Coast Guard, which monitors marine distress frequencies continuously to protect life and property. Ship station equipment includes fixed mount marine radios, radar, Emergency Position Indicating Radio Beacons (EPIBs), single sideband radiotelephones and satellite radios.

In particular, marine radios are an important part of marine communications. Marine radios are employed to call a remote ship station, place a call through a public coast station, receive a shore to ship call and initiate a marine distress call. For example, an operator places a call to a remote ship station by first ensuring that the fixed mount marine radio is operational. The operator then selects Channel 16 (156.8 MHz) and listens to make sure it is not being used. Alternatively, Channel 9 (156.45 MHz) may be used by recreational vessels for general purpose calling. This frequency should be used whenever possible to relieve congestion of Channel 16. When the Channel is quiet, the operator places the call to the ship. The operator speaks directly into the fixed mount marine radio microphone in a normal tone of voice with clarity and distinctiveness and states "[name of ship being called] THIS IS [the name and call sign (if applicable) of the ship where the call is being placed]." Once contact is made on Channel 16, the ships switch to a ship-to-ship channel. For example, if the call regards a noncommercial message, Channel 71, 72 or 78 may be selected. Alternatively, if the call regards a navigational message, Channel 13 or 67 may be selected. After communications are completed, each ship provides its call sign or ship name and switches back to Channel 16.

Typical marine radios are fixed mounted at the radio station of the vessel. Usually, the radio station of the vessel is positioned at the bridge. Therefore, an operator or seaman is limited to using the fixed mount marine radio at the bridge. This limitation is problematic for operators of both small and large marine vessels. Marine vessels, regardless of size, may have a limited crew and may not have a full-time radio operator. Marine vessels, however, may have a need to be able to send and receive marine communications at any time. Accordingly, a need exists for a system and method of marine communications that an operator may employ throughout the marine vessel.

SUMMARY OF THE INVENTION

The present invention disclosed herein comprises a mobile communications apparatus for wireless communication with a fixed mount marine radio. The system and methods of the present invention enable an operator to send and receive marine communications at any time and from any location in the vessel.

In one aspect, the present invention is directed to a mobile communications apparatus that includes a radio-frequency communicator that is selectively operable to transmit wireless communications to the fixed mount marine radio in a sending mode and to receive wireless communications from the fixed mount marine radio in a receiving mode. A speaker is coupled to the radio-frequency communicator and generates sound associated with received wireless communications when the radio-frequency communicator is in the receiving mode. A microphone is coupled to the radio-frequency communicator and receives sound for wireless communication when the radio-frequency communicator is in the sending mode. An actuator operates the radio-frequency communicator between the sending mode and the receiving mode.

In another aspect, the present invention is directed to a marine communications system that includes a fixed mount marine radio and a mobile communications apparatus. The fixed mount marine radio is selectively operable to transmit marine communications in a sending mode and receive marine communications in a receiving mode. The fixed mount marine radio includes a microphone that is attached to the fixed mount marine radio via a wireline that receives sound for marine communication when the fixed marine radio is in the sending mode and a speaker mounted within the fixed mount marine radio that generates sound associated with received marine communications when the fixed mount marine radio is in the receiving mode.

In another aspect, the present invention is directed to a method for receiving marine communications. The method includes sending a marine communication on a first frequency from a mobile communications apparatus to a fixed mount marine radio and sending the marine communication on a second frequency from the fixed mount marine radio to a remote station.

In another aspect, the present invention is directed to a method for receiving marine communications. The method includes receiving a marine communication from a remote station on a first frequency on a fixed mount marine radio and sending the marine communication on a second frequency to a mobile communications apparatus from the fixed mount marine radio.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 3A is a functional block diagram of the marine communications system of the present invention;

FIG. 4 is a flow chart depicting a method for employing the mobile communications apparatus of the present invention in marine communication;

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
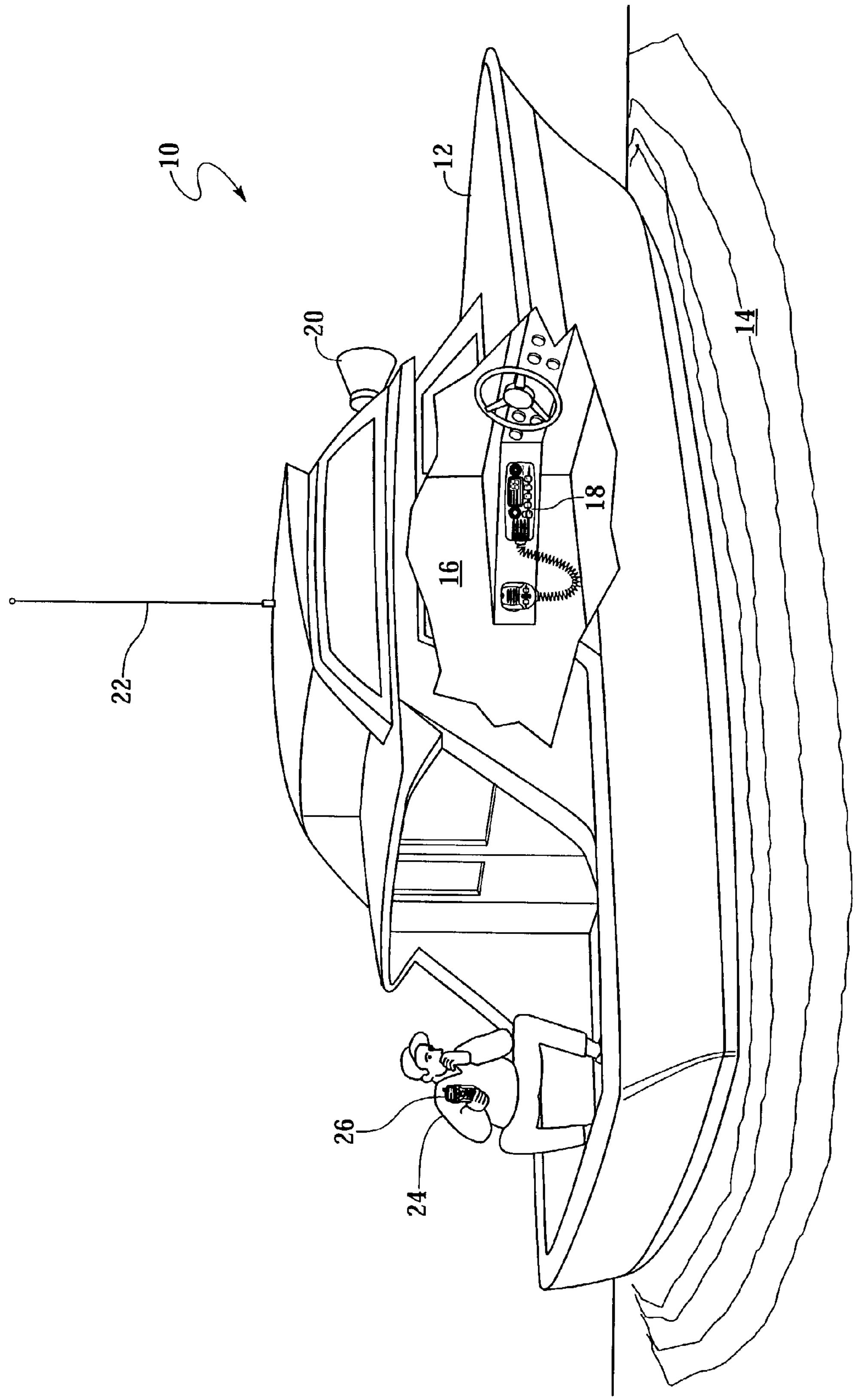
FIG. 1 is a schematic illustration with partial cut away of a marine communications system of the present invention employed on a marine vessel.

Referring initially to FIG. 1, a marine communications system of the present invention is being employed in a marine vessel that is schematically illustrated and generally designated 10. A marine vessel 12 is at sea in water 14. A shipboard radio station 16 positioned at the bridge of marine vessel 12 is fitted with a fixed mount marine radio 18. A loud speaker 20 and antenna 22 are coupled to fixed marine radio 18 to provide audio and wireless marine communications, respectively. Preferably, fixed mount marine radio 18 is a very high frequency (VHF) FM radio that allows ship station 16 to communicate with other remote ship stations and coast stations over short distances. More preferably, fixed mount marine radio is able to send and receive on all USA, Canadian and International marine channels. A seaman 24 is holding a mobile communications apparatus 26 which wirelessly communicates with fixed mount marine radio 18, thereby enabling an operator to send and receive marine communications from any position on marine vessel 12. For example, as illustrated, seaman 24 is positioned towards the aft of marine vessel 12 and away from the bridge and fixed mount marine radio 18. Mobile communication apparatus 26, however, provides marine communications via wireless communication with fixed mount marine radio 18.

Figure 2:
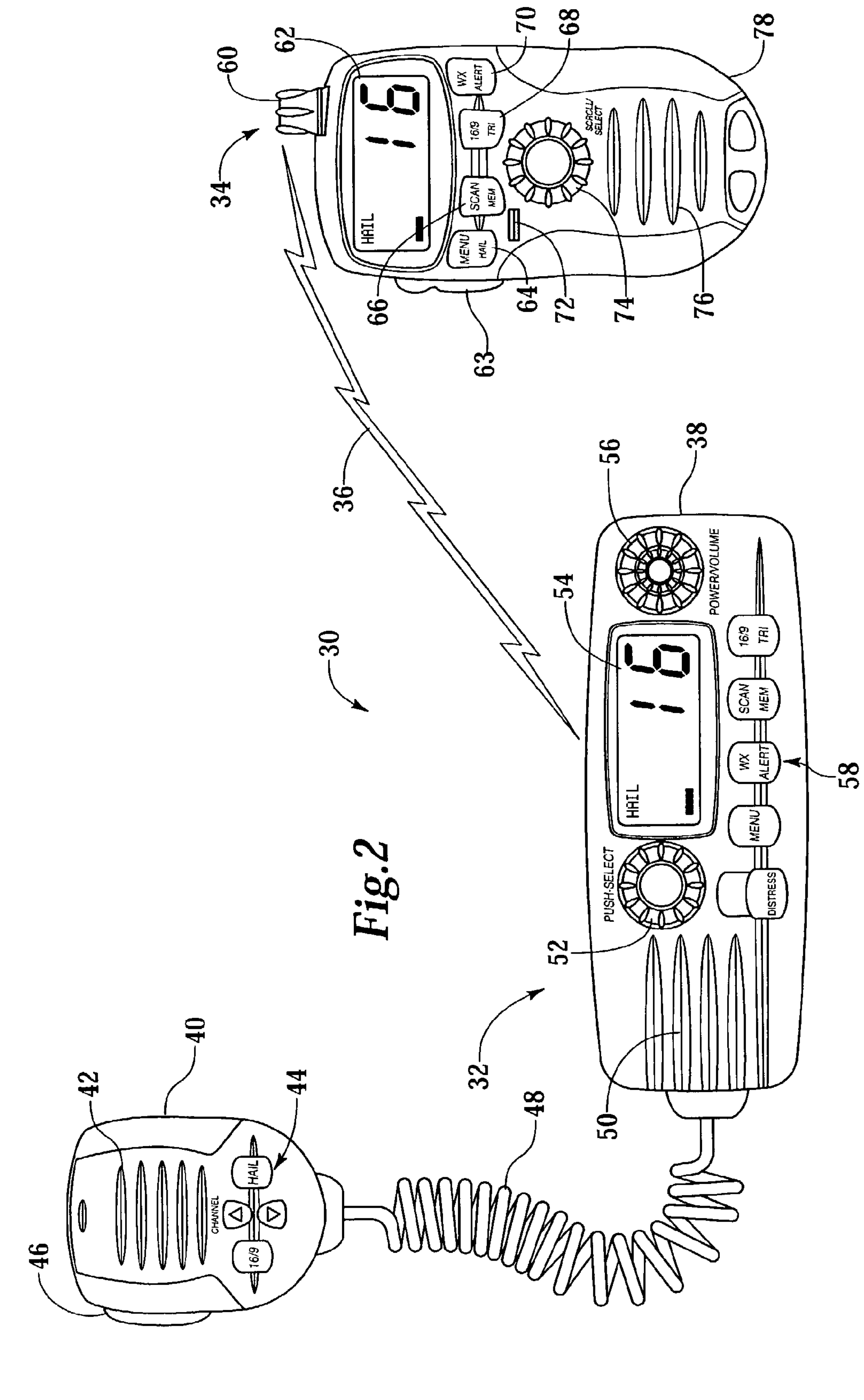
FIG. 2 is a schematic illustration of a fixed mount marine radio and mobile communications apparatus of the present invention.

Referring now to FIG. 2, a wireless communication system 30 is illustrated that provides for mobile marine communications. A fixed mount marine radio 32 and mobile communications apparatus 34 are in wireless communication as represented by communication line 36. Preferably, the wireless communication occurs at 900 MHz or 2.4 GHz. It should be understood, however, that the fixed mount marine radio 32 and mobile communications apparatus 34 may communicate at any frequency and the frequency chosen will depend on multiple considerations including manufacturing costs and government regulations.

Fixed mount marine radio 32 includes a base station 38 and a hand microphone 40. Fixed mount marine radio 32 is selectively operable to transmit marine communications in a sending mode and receive marine communications in a receiving mode. Hand microphone 40 includes a microphone 42, functions 44 and push to talk actuator 46. Microphone 42 receives sound for marine communication when fixed mount marine radio 32 is in the sending mode. Push to talk actuator 46 selectively operates fixed mount marine radio 32 between the sending mode and the receiving mode. By hand actuating push to talk actuator 46, microphone 40 receives sound and fixed mount marine radio 32 is operable to send marine communications.

As illustrated, functions 44 include a 16/9 channel function, channel selection and a hailer. The 16/9 channel key tunes the fixed mount marine radio to Channel 16 (156.8 MHz) with one click and to Channel 9 (156.45 MHz) with two clicks. Channel 16 is the international distress, safety and calling channel. Boaters use this channel to get the attention of another station or in emergencies. Boats and ships required to carry a fixed mount marine radio and the United States Coast Guard maintain a listening watch on this channel. Channel 9 is the boater calling channel established by the Federal Communications Commission (FCC) as a supplementary calling channel for noncommercial vessels and recreational boaters to ease the congestion of Channel 16. Accordingly, the ease of access that the 16/9 channel function provides to Channels 16 and 9 is very valuable on navigable waterways.

The channel selection key provides easy channel selection with an up arrow that increases the channel and a down arrow that decreases the channel. The hailer key changes the mode of marine communication from wireless to auditory by switching from the antenna 22 of FIG. 1 to the loud speaker 20 of FIG. 1.

Wireline 48, a cord, connects hand microphone 40 and base station 38. Base station 38 includes speaker 50 that generates sound associated with marine communications when fixed mount marine radio 32 is in the receiving mode. A push-select knob 52 provides a tool for navigating the software menu. Display 54 displays information about the function of fixed marine radio 32 such as the currently tuned channel. A power/volume control 56 controls ON/OFF, power level and volume. As illustrated, functions 58 include a distress call key, a menu key, a weather (WX) alert key, a scan memory key and a 16/9 TRI key. The distress call key sends out a distress call in Digital Selective Calling (DSC). In general DSC is used to establish communications with ship or coast stations or to receive calls from other ships or coast stations. DSC works in conjunction with VHF, MF and HF radio systems and employs a two tone digital signal protocol to selectively call a particular station or to call a group of stations, all stations in a particular geographic area or to call all stations.

The menu key provides access to the software menu. The software menu provides features such as a programmable memory. The WX alert key changes the channel to the last used weather channel. Alternatively, the weather alert function may be equipped with Specific Area Message Encoding (SAME). The scan memory key scans preprogrammed channels. The 16/9 TRI key accesses Channel 16, Channel 9 and provides a triple watch mode. It should be understood by those skilled in the art that although the fixed mount marine radio has been illustrated with certain functions, other functions known in marine communications are within the teachings of the present invention. For example, the fixed mount marine radio may be equipped with a squelch control key in order to eliminate output noise when no marine communication or an extremely weak marine communication is received.

Mobile communications apparatus 34 includes a channel selection mechanism 60. By turning channel selection mechanism 60 to the left or right, a channel may be selected. Mobile communications apparatus 34 relays the channel selection to the fixed mount marine radio on a frequency, such as 900 MHz or 2.4 GHz. Fixed mount marine radio 32 then tunes in to the selected channel and relays marine communications to the mobile communications apparatus 34. Fixed mount marine radio 32 may tune into Coast Guard Channel 22A (157.1 MHz), the "piloting" Channel 13 (156.65 MHz) or ship-to-ship safety Channel 6 (156.3 MHz), for example. It should be apparent to those skilled in the art that while fixed mount marine radio 32 sends and receives marine communications on a wide band of marine frequencies, such as VHF band, over relatively great distances, mobile communications apparatus 34 receives marine communications via a relay with fixed mount marine radio 32 at a different frequency band over relatively shorter distances.

A display 62 is positioned on mobile communications apparatus 34 to provide a functionality similar to display 54 of fixed mount marine radio 32. A push to talk actuator 63 is positioned on the side of mobile communications apparatus 34. Similar to push to talk actuator 46, push to talk actuator 63 selectively operates fixed mount marine radio 32 and mobile communications apparatus 34 between the sending mode and the receiving mode. By hand actuating push to talk actuator 63, mobile communications apparatus 34 sends a signal to fixed mount marine radio 32 to switch fixed mount marine radio 32 to the send mode. Moreover, by hand actuating push to talk actuator 63, mobile communications apparatus 34 may receive sound for marine communication. It should be understood by those skilled in the art that although a particular system of control interrupts has been presented, alternative interrupt schemes are within the teachings of the present invention.

The functions mounted onto the mobile communications apparatus include a menu/hail key 64, a scan memory key 66, a 16/9 TRI key 68 and a WX alert key 70. These function keys are identical to the functions 44 and 58 positioned on fixed mount marine radio 32. As briefly described already and as will be described in more detail hereinbelow, when a function is selected on mobile communication apparatus 34, the function is sent to fixed mount marine radio 32 where the function is performed and an output is sent back to mobile communications apparatus 34. Similar to functions 44 and 58 of fixed mount marine radio 32, other functions known in marine communications may be employed with the mobile communications apparatus 34 of the present invention. For example, the mobile communications apparatus 34 may include a function that turns the fixed mount marine radio 32 ON and OFF.

Microphone 72 receives sound for wireless communication when fixed mount marine radio 32 is in the sending mode. A scroll/select knob 74 provides a navigation tool for the software menu. Speaker 76 generates sound associated with received wireless communications when fixed mount marine radio 32 is in the receiving mode. A waterproof casing 78 is positioned on the outside of the mobile communications apparatus 34 to provide protection from water. Optionally, mobile communications apparatus 34 may include a belt clip or other suitable carrying mechanism. It should be appreciated by those skilled in the art that although only one mobile communication apparatus is presented communicating with fixed mount marine radio 32, more than one mobile communication apparatus may be employed to communicate with fixed mount marine radio 32.

Referring now to FIG. 3A, a marine communications system 80 of the present invention is depicted. A fixed mount marine radio 82 and mobile communications apparatus 84 are in communication as illustrated by communication line 85. Preferably, fixed mount marine radio 82 and mobile communications apparatus 84 communicate at 900 MHz, 2.4 GHz or other frequency in the narrowband Personal Communications Spectrum (PCS) spectrum.

A microprocessor 86 controls the operations of the fixed mount marine radio 82. A loud speaker 88 is electrically coupled to microprocessor 86 and positioned outside fixed mount marine radio 82 as depicted by the placement outside the dashed lines. When fixed mount marine radio 82 is in the sending mode and the hailer function is activated, microprocessor 86 routes the marine communication through loud speaker 88 for local auditory marine communications. Microphone 90 and speaker 92 are electrically coupled to microprocessor 86. Microphone 90 receives sound for marine communication when fixed mount marine radio 82 is in the sending mode. Speaker 92 generates sound associated with received marine communications when fixed mount marine radio 82 is in the receiving mode.

Display 94 is electrically coupled to microprocessor 86 to provide a visual output for data such as the status of the hailer function and the current channel, for example. Input 96 is coupled to microprocessor 86. Input 96 may be any function such as the volume control or 16/9 key, for example. Transceiver 98 is electrically coupled to microprocessor 86 to convert received radio frequencies into electrical signals for processing by microprocessor 86 and to convert electrical signals into radio frequency for transmission. Transceiver 98 sends and receives radio frequencies with antenna 100. Transceiver 98 and antenna 100 communicate with mobile communications apparatus 84.

Similarly, transceiver 102 is electrically coupled to microprocessor 86 to convert received radio frequencies into electrical signals for processing by microprocessor 86 and to convert electrical signals into radio frequency for transmission. A push to talk actuator 104 operates transceiver 102 and fixed mount marine radio 82 between the sending and the receiving mode. An antenna 106 radiates radio frequency waves towards remote stations, such as remote ship stations or coast stations, and receives radio frequency waves from remote stations. Memory 108 stores the data necessary for the operation of fixed mount marine radio 82. Although fixed mount marine radio 82 is illustrated with a particular configuration, the fixed mount marine radio may have a different configuration. For example, only one antenna or an antenna array may be present. Additionally, fixed mount marine radio 82 may employ any power source such as a DC connection to a ship generator or batteries.

A microprocessor 110 controls the operations of mobile communications apparatus 84. Microphone 112 and speaker 114 are coupled to microprocessor 110. Microphone 112 is operational when the operator is speaking and fixed mount marine radio 82 is in the sending mode by pressing a push to talk actuator 122 as discussed in more detail below. Conversely, speaker 114 is operational when fixed mount marine radio 82 and mobile communications apparatus 84 are in the receiving mode. Preferably, fixed mount marine radio 82 defaults in the receiving mode. Display 116 and input 118 are coupled to microprocessor 110 and operate similar to display 94 and input 96. Transceiver 120 is electrically coupled to microprocessor 110 to convert received radio frequencies into electrical signals for processing by microprocessor 110 and to convert electrical signals into radio frequency for transmission. The push to talk actuator 122 operates transceiver 120 between the sending and the receiving modes. An antenna 124 radiates radio frequency waves to and receives radio frequency waves from fixed mount marine radio 82, and more specifically, antenna 100. Microprocessor 110, transceiver 120, push to talk actuator 122 and antenna 124 may be considered a radio-frequency communicator. It should be understood, however, that the radio-frequency communicator may comprise additional or different electronic communication elements. Memory 126 stores the data necessary for the operation of mobile communication apparatus 84. Preferably, mobile communications apparatus 84 is battery powered.

Figure 3B:
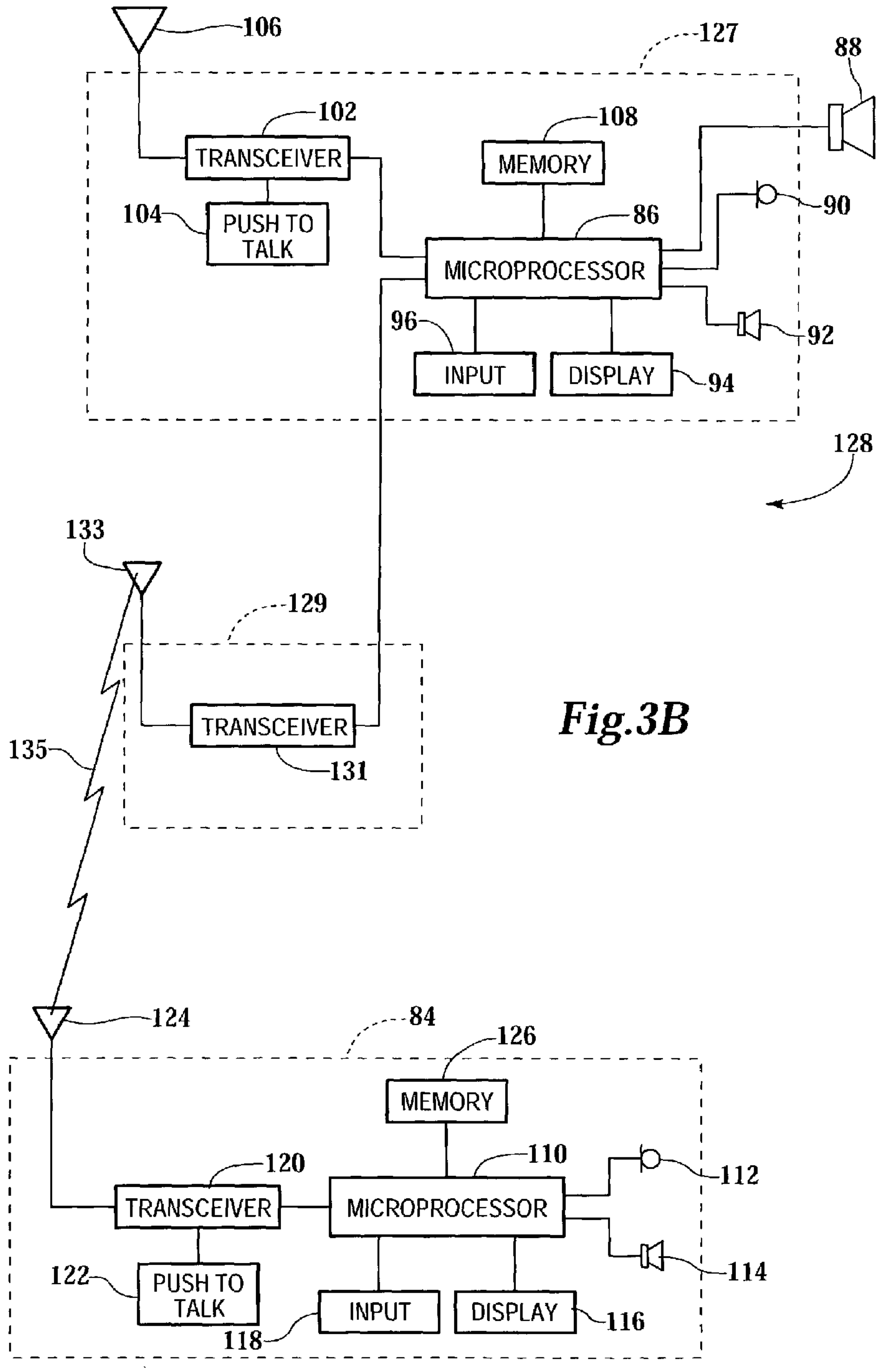
FIG. 3B is a functional block diagram of another embodiment of the marine communications system of the present invention.

Moreover, as best illustrated in FIG. 3B, a marine communications system 128 of the present invention may include a fixed mount marine radio 127 in communication with a separate communications unit 129 that includes a transceiver 131 and an antenna 133 which communicate with mobile communications apparatus 84 via communications line 135. The operation of marine communications system 128 is similar to the operation of the marine communications system 80 of FIG. 3A described in detail hereinabove.

Referring now to FIG. 4, an exemplary methodology of a marine communications is depicted. At step 130, an operator enters input into the mobile communications apparatus, i.e., the mobile unit. The input may be a function such as channel selection or the actuation of the push to talk actuator followed by speech. At step 132, the mobile communications apparatus relays the input to a fixed mount marine radio on a first frequency such as 900 MHz or 2.4 GHz. At step 134, the input is executed by the fixed mount marine radio in an operation and a corresponding output is generated. Continuing with the illustrative examples, the operation and output may be changing the channel and receiving a weather report on a second frequency, such as 162.40 MHz (Channel WX-2), or transmitting a marine communication on a certain channel at a second frequency such as 156.45 MHz (Channel 9). At step 136, the output is relayed back to the mobile communications apparatus. The output may be an indication of channel selection or a return communication, for example. At step 138, an output is generated from the mobile communications apparatus based on the output received from the fixed mount marine radio. The output is communicated via a display or speaker.

Figure 5:
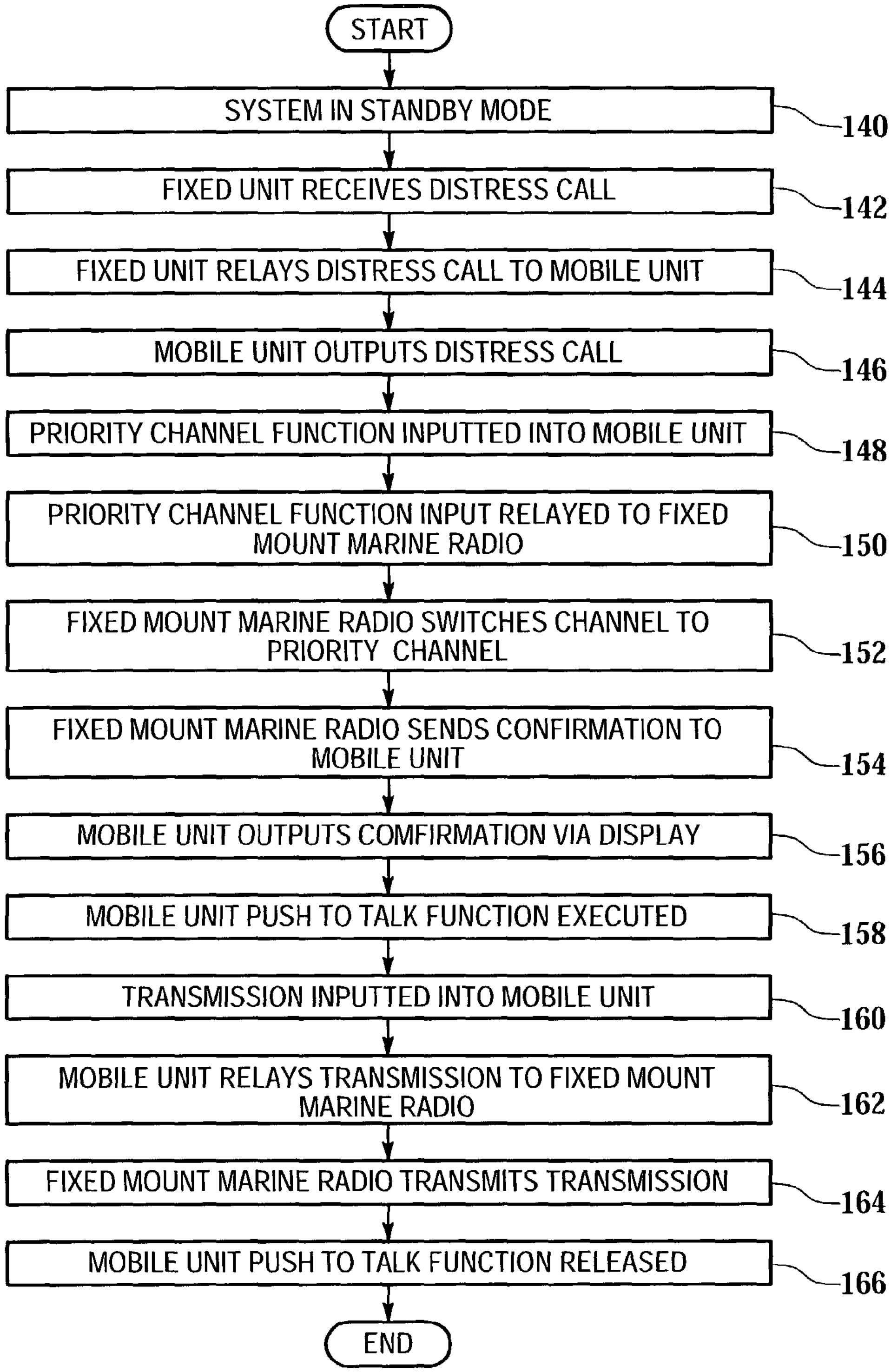
FIG. 5 is a flow chart depicting the reception of a distress call by the mobile communications apparatus of the present invention.

Referring to FIG. 5, the reception of a distress call by the mobile communications apparatus of the present invention is depicted. At step 140, the marine communication system of the present invention is in standby mode. Preferably, the system defaults in a receiving mode. At step 142, a fixed mount marine radio, i.e., a fixed unit, receives a distress call on a first frequency, such as a MAYDAY, PAN PAN or SECURITE. By way of example, the distress call is a MAYDAY received on a first frequency (Channel 9 156.45 MHz). The operator, however, is not at the ship radio station which is located on the bridge. The operator is in the vessel's state room with his mobile communications apparatus. At step 144, the fixed mount marine radio relays the MAYDAY to the mobile communications apparatus, i.e., the mobile unit, on a second frequency, such as 900 MHz or 2.4 GHz. At step 146, the distress call is outputted via the mobile communications apparatus speakers. The distress call entails the distressed ship's identification, name, location and a brief description of the nature of the distress. The operator realizes his ship is too far away to help the distressed ship.

At step 148, the operator switches to priority Channel 16 by pressing the 16/9 function key. At step 150, the mobile communications apparatus relays the channel selection input to the fixed mount marine radio via the second frequency. At step 152, the fixed mount marine radio tunes to Channel 16. At step 154, the fixed mount marine radio sends the mobile communications apparatus confirmation of the channel selection via the second frequency. At step 156, the mobile communications apparatus outputs the channel selection by displaying "16" on the display. At step 158, the operator actuates the push to talk function. This places both the mobile communications apparatus and the fixed mount marine radio in a sending mode. At step 160, the operator sends out the MAYDAY distress call on behalf of the distressed vessel. At step 162, the mobile communications apparatus sends the marine transmission to the fixed mount marine radio via the second frequency. At step 164, the fixed unit transmits the distress call on a third frequency (Channel 16 156.8 MHz) to the Coast Guard so that the distressed vessel may receive aid. At step 166, the operator releases the push to talk actuator. Accordingly, the present invention enables an operator to send and receive marine communications when the operator is not positioned at the fixed mount marine radio.

Figure 6:
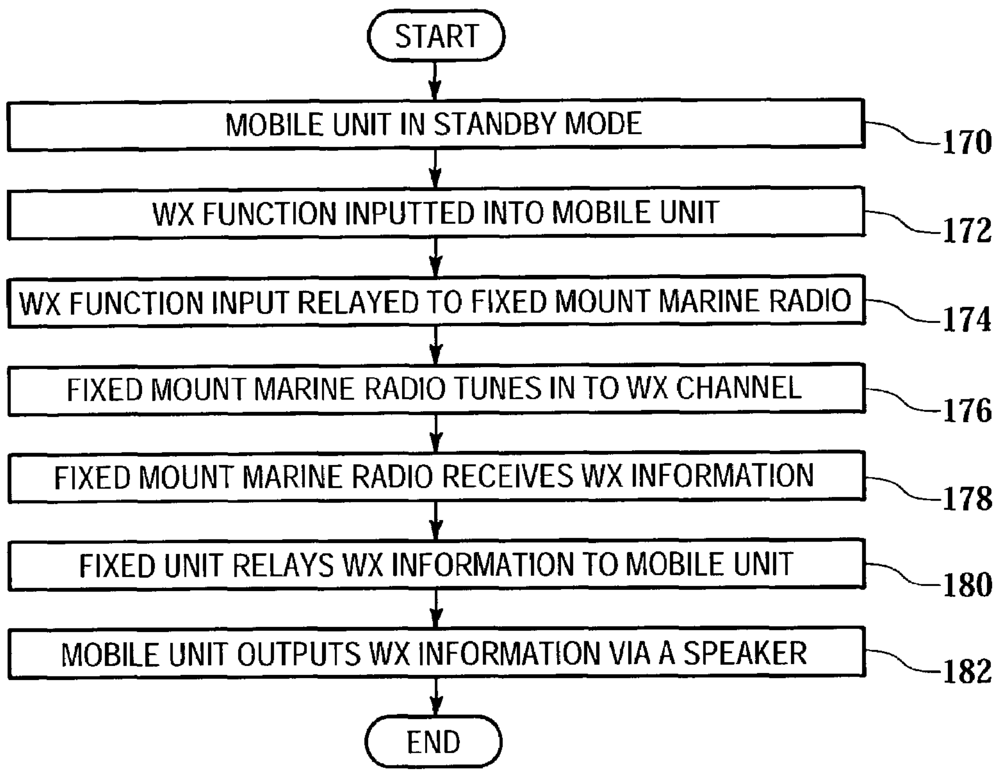
FIG. 6 is a flow chart depicting the operation of a weather channel function of the mobile communications apparatus of the present invention.

Referring to FIG. 6, the operation of a weather channel feature of the mobile communications apparatus of the present invention is depicted. At step 170, the mobile communications apparatus, i.e. the mobile unit, is in a standby mode. At step 172, an operator inputs the WX weather alert function into the mobile communications apparatus. At step 174, the WX alert function is relayed to a fixed mount marine radio, i.e. the fixed unit, at a first frequency such as 900 MHz. At step 176, the fixed mount marine radio tunes into the previously monitored weather channel such as 162.55 MHz (Channel WX-1). At step 178, the fixed mount marine radio receives weather information at a second frequency. At step 180, the weather information is relayed to the mobile communications apparatus at the first frequency. At step 182, the mobile communications apparatus outputs the weather information via a speaker. Other features such as the 16/9 function and channel selection function, for example, have a similar operation to the WX alert feature.

Figure 7:
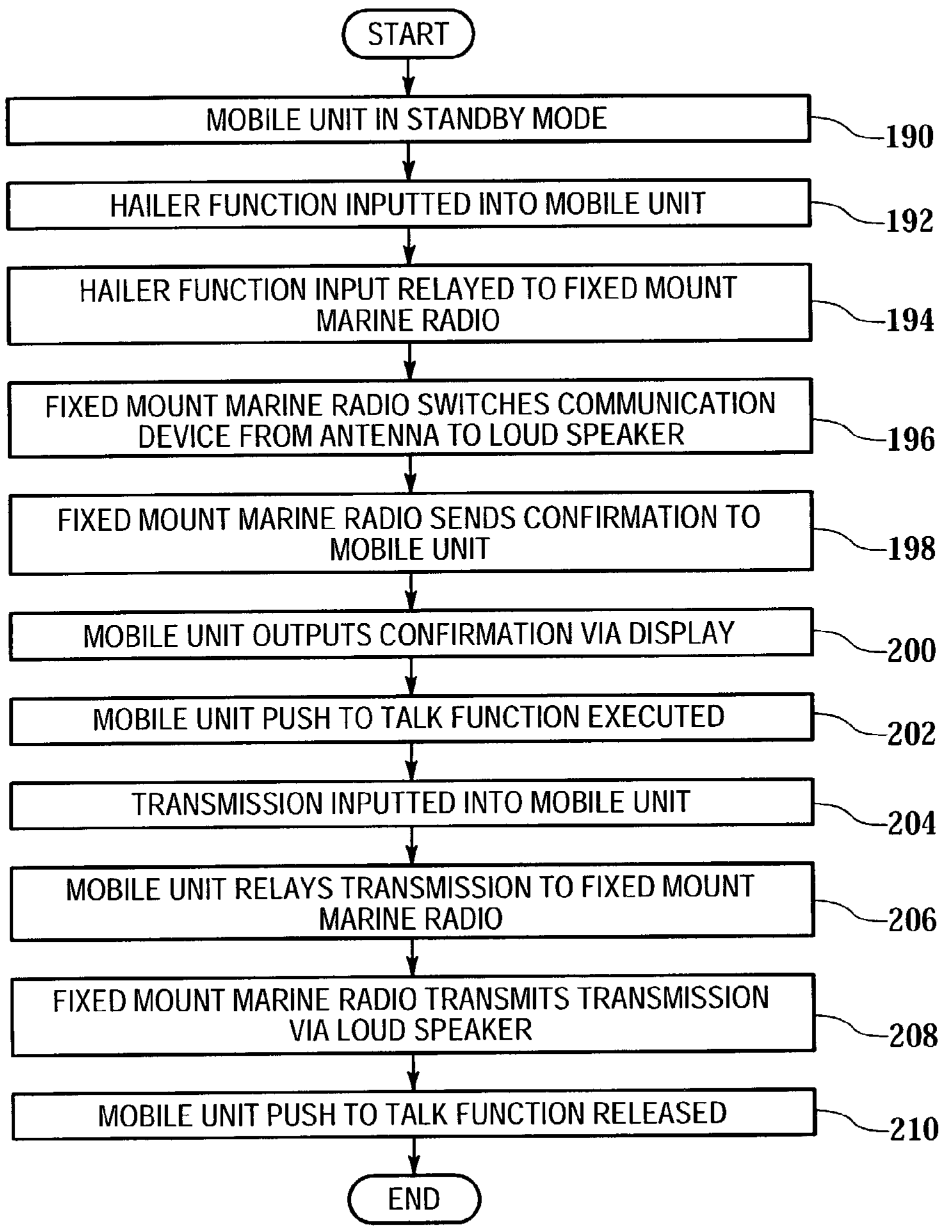
FIG. 7 is a flow chart depicting the operation of the hailer function of the mobile communications apparatus of the present invention.

Referring to FIG. 7, the operation of the hailer function of the mobile communications apparatus of the present invention is depicted. At step 190, the mobile unit is in standby mode. At step 192, the hailer function is inputted into the mobile unit by pressing the MENU/HAIL key twice. At step 194, the hailer function is relayed to the fixed mount marine radio, i.e, the fixed unit. At step 196, the fixed mount marine radio switches the mode of marine communications from the antenna to the loud speaker. At step 198, the fixed unit sends confirmation of the switch. At step 200, the mobile unit outputs the confirmation by displaying the word "HAIL" on the display. At step 202, the operator actuates the push to talk feature. The actuation is relayed to the fixed mount marine radio which switches the fixed mount marine radio from a receiving mode to a sending mode. At step 204, the operator speaks a transmission into the mobile communications apparatus. At step 206, the mobile communications apparatus relays the transmission to the fixed mount marine radio. At step 208, fixed mount marine radio transmits the transmission via the loud speaker. At step 210, the push to talk feature is released.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A mobile communications apparatus for wireless communication with a fixed mount marine radio comprising:

a radio-frequency communicator selectively operable to transmit wireless communications to the fixed mount marine radio in a sending mode and to receive wireless communications from the fixed mount marine radio in a receiving mode, the radio-frequency communicator selectively operable to transmit a hailer function to the fixed mount marine radio that operates the fixed mount radio from an antenna broadcast mode to a loud speaker broadcast mode;

a speaker coupled to the radio-frequency communicator, the speaker generating sound associated with received wireless communications when the radio-frequency communicator is in the receiving mode;

a microphone coupled to the radio-frequency communicator, the microphone receiving sound for wireless communication when the radio-frequency communicator is in the sending mode; and an actuator that operates the radio-frequency communicator between the sending mode and the receiving mode.

2. The mobile communications apparatus as recited in claim 1 further comprising a waterproof casing that provides the mobile communications apparatus protection from water.

3. The mobile communications apparatus as recited in claim 2 further comprising a belt clip coupled to the waterproof casing.

4. The mobile communications apparatus as recited in claim 1 wherein the mobile communications apparatus is operable to operate the fixed mount marine radio to communicate on all USA and International Marine Channels.

5. The mobile communications apparatus as recited in claim 1 wherein the mobile communications apparatus is operable to operate the fixed mount marine radio to communicate on a frequency within the very high frequency (VHF) band.

6. The mobile communications apparatus as recited in claim 1 wherein the mobile communications apparatus is operable to operate the fixed mount marine radio to communicate on a frequency selected from the group consisting of 156.8 MHz, 157.1 MHz, 156.65 MHz and 156.3 MHz.

7. The mobile communications apparatus as recited in claim 1 wherein the mobile communications apparatus is operable to selectively operate the fixed mount marine radio between a sending mode and a receiving mode.

8. The mobile communications apparatus as recited in claim 1 wherein the mobile communications apparatus is operable to communicate with the fixed mount marine radio on a wire less frequency selected from 900 MHz and 2.4 GHz.

9. The mobile communications apparatus as recited in claim 1 wherein the mobile communications apparatus is operable to operate the fixed mount marine radio to perform at least one function selected from the group consisting of digital selective calling, Specific Area Message Encoding (SAME)/weather channel selection, squelch, memory scan and weather scan.

10. The mobile communications apparatus as recited in claim 1 wherein the radio-frequency communicator further comprises a transceiver.

11. A method for operating a marine radio system comprising the steps of:

selecting a hailer function at a mobile communications apparatus having a radio-frequency communicator, a speaker, a microphone and an actuator;

transmitting the hailer function from the mobile communications apparatus to a fixed mount marine radio;

operating the fixed mount radio from an antenna broadcast mode to a loud speaker broadcast mode; and selectively operating the mobile communications apparatus between a sending mode to transmit wireless communications to the fixed mount marine radio and a receiving mode to receive wireless communications from the fixed mount marine radio using the actuator.

12. The method as recited in claim 11 further comprising the steps of:

receiving a communication via the microphone of the mobile communications apparatus when the mobile communications apparatus is in the sending mode and the fixed mount marine radio is in the loud speaker broadcast mode;

wirelessly transmitting the communication from the mobile communications apparatus to the fixed mount marine radio; and broadcasting the communication over a loud speaker associated with the fixed mount marine radio.

13. The method as recited in claim 11 further comprising the step of selecting an additional function selected from the group consisting of digital selective calling, Specific Area Message Encoding (SAME)/weather channel selection, squelch, memory scan and weather scan.

14. The method as recited in claim 11 further comprising selecting a channel for a marine communication from the group consisting of all USA Marine Channels and International Marine Channels at a mobile communications apparatus.

15. The method as recited in claim 11 further comprising selecting a channel for a marine communication on a frequency within the very high frequency (VHF) band at a mobile communications apparatus.

16. The method as recited in claim 11 further comprising selecting a channel for a marine communication on a frequency selected from the group consisting of 156.8 MHz, 157.1 MHz, 156.65 MHz and 156.3 MHz at a mobile communications apparatus.

17. The method as recited in claim 11 wherein the wireless communications between the fixed mount marine radio and the mobile communications apparatus are at a frequency selected from the group consisting of 900 MHz and 2.4 GHz.

18. The method as recited in claim 11 wherein the fixed mount marine radio and mobile communications apparatus are associated with a marine vessel.

19. The method as recited in claim 11 wherein the radio-frequency communicator further comprises a transceiver.

20. A marine communications system comprising:

a fixed mount marine radio selectively operable to wirelessly communicate with remote stations in an antenna broadcast mode and selectively operable transmit auditory communications via a loud speaker broadcast mode, the fixed mount marine radio including a first microphone having a wireline connection thereto that receives sound for marine communication and a first speaker internal thereto that generates sound associated with received marine communications; and a mobile communications apparatus operable for wireless communication with the fixed mount marine radio, the mobile communications apparatus operable to transmit a hailer function to the fixed mount marine radio that operates the fixed mount radio from the antenna broadcast mode to the loud speaker broadcast mode, the mobile communications apparatus including a radio-frequency communicator, an actuator that operates the mobile communications apparatus between a sending mode and a receiving mode, a second microphone that receives sound for marine communication and a second speaker that generates sound associated with received marine communications.

21. The mobile communications system as recited in claim 20 wherein the mobile communications apparatus is operable to selectively operate the fixed mount marine radio between a sending mode and a receiving mode.

22. The mobile communications system as recited in claim 20 wherein the fixed mount marine radio is coupled to an antenna for wireless marine communications between the fixed mount marine radio and the remote stations.

23. The marine communications apparatus as recited in claim 20 wherein the fixed mount marine radio is operable to perform at least one function selected from the group consisting of digital selective calling, Specific Area Message Encoding (SAME)/weather channel selection, squelch, memory scan and weather scan.

24. The marine communications system as recited in claim 20 wherein the actuator further operates the fixed mount marine radio between a sending mode and a receiving mode.

25. The marine communications system as recited in claim 20 wherein the wireless communications between the fixed mount marine radio and the mobile communications apparatus are at a frequency selected from the group consisting of 900 MHz and 2.4 GHz.

26. The marine communications system as recited in claim 20 wherein the fixed mount marine radio and mobile communications apparatus are associated with a marine vessel.

27. The marine communications system as recited in claim 20 wherein the mobile communications apparatus further comprises a waterproof casing that provides the mobile communications apparatus protection from water.

28. The marine communications system as recited in claim 20 wherein the mobile communications apparatus further comprise a belt clip.

29. The marine communications system as recited in claim 20 wherein the mobile communications apparatus is operable to select a channel for a marine communication from the group consisting of all USA Marine Channels and International Marine Channels.

30. The marine communications system as recited in claim 20 wherein wireless communication between the fixed mount marine radio and the remote stations is at a frequency within the very high frequency (VHF) band.

31. The marine communications system as recited in claim 20 wherein wireless communication between the fixed mount marine radio and the remote stations is at a frequency selected from the group consisting of 156.8 MHz, 157.1 MHz, 156.65 MHz and 156.3 MHz.

32. The marine communications system as recited in claim 20 wherein the radio-frequency communicator further comprises a transceiver.

* * * * *